United States Patent
Park et al.

(10) Patent No.: US 8,836,959 B2
(45) Date of Patent: Sep. 16, 2014

(54) METHOD AND APPARATUS FOR RECOGNIZING CHARACTERS

(75) Inventors: Kyung-Ho Park, Suwon-si (KR); Dong-Hyun Lee, Seongnam-si (KR); Jae-Myung Baek, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 766 days.

(21) Appl. No.: 12/708,272

(22) Filed: Feb. 18, 2010

(65) Prior Publication Data
US 2010/0208308 A1    Aug. 19, 2010

(30) Foreign Application Priority Data

Feb. 18, 2009 (KR) .................. 10-2009-0013440

(51) Int. Cl.
*G06K 9/00* (2006.01)
*G06K 9/22* (2006.01)
*H04N 1/107* (2006.01)

(52) U.S. Cl.
CPC ............... *H04N 1/107* (2013.01); *G06K 9/228* (2013.01); *G06K 2209/01* (2013.01); *H04N 1/1071* (2013.01)
USPC .......... 358/1.11; 358/462; 358/473; 358/474; 358/486; 358/497; 382/313; 382/321

(58) Field of Classification Search
CPC ........... G06K 9/46; G06K 9/22; G06K 9/228; G01P 1/023; G01P 1/026
USPC .......... 358/462, 473, 474, 486, 497; 382/312, 382/313, 321
See application file for complete search history.

(56) References Cited

U.S. PATENT DOCUMENTS

| | | | | | |
|---|---|---|---|---|---|
| 4,793,812 | A | * | 12/1988 | Sussman et al. | 434/116 |
| 4,897,880 | A | * | 1/1990 | Wilber et al. | 382/177 |
| 5,054,104 | A | * | 10/1991 | Yamaguchi | 382/309 |
| 5,595,445 | A | * | 1/1997 | Bobry | 400/88 |
| 2006/0029296 | A1 | * | 2/2006 | King et al. | 382/313 |

FOREIGN PATENT DOCUMENTS

| | | | |
|---|---|---|---|
| EP | 279655 | A2 * | 8/1988 |
| JP | 2006-094082 | | 4/2006 |
| KR | 1020050106588 | | 11/2005 |
| WO | WO 2005101192 | A2 * | 10/2005 |

\* cited by examiner

*Primary Examiner* — Jamares Q Washington
(74) *Attorney, Agent, or Firm* — The Farrell Law Firm, P.C.

(57) ABSTRACT

A method and apparatus are provided for recognizing characters in a portable terminal with a scan module. Scanned image data is generated by the scan module by scanning a scan target through a scanning-light input/output panel provided on an external surface of the portable terminal as the portable terminal moves across the scan target. Part of the scanned image data is deleted when a current moving speed of the portable terminal is less than a lower limit of an optimal scan speed range, and character recognition is performed on remaining scanned image data. Image data most similar to the scanned image data is detected from a previously stored correction image database when the current moving speed is greater than an upper limit of the optimal scan speed range, and characters corresponding to the detected image data are output as character recognition results.

11 Claims, 4 Drawing Sheets

METHOD AND APPARATUS FOR RECOGNIZING CHARACTERS

PRIORITY

This application claims priority under 35 U.S.C. §119(a) to a Korean Patent Application filed in the Korean Intellectual Property Office on Feb. 18, 2009 and assigned Serial No. 10-2009-0013440, the entire disclosure of which is incorporated herein by reference.

BACKGROUND OF THE INVENTION

1. Field of the Invention

The present invention relates generally to character recognition, and more particularly, to a method and apparatus for recognizing characters using a scanner.

2. Description of the Related Art

As a result of the continued development of electronic technologies, portable terminals, such as mobile communication terminals, Personal Digital Assistants (PDAs) and portable game consoles, have a variety of additional functions aside from their respective dedicated functions. For example, in addition to a device required for communication, a mobile communication terminal may include a digital camera or a sound source player to offer a user a photographing or a music playing function.

An electronic dictionary function may also be provided as an additional function in the portable terminal. Presently, most portable terminals have built-in electronic dictionaries that users may consult for definitions.

An input device that is provided in a portable terminal typically has a limited number of keys or buttons in order to ensure smaller size and portability. Thus, sufficient keys may not be provided to conveniently input numerals and characters due to the fact that a plurality of numerals and characters are appointed to each key. Therefore, the time that is required for the user to input words using the limited number of keys may cause an inconvenience due to key manipulation.

When a user desires to find words using an electronic dictionary in the conventional portable terminal, the user inputs the related characters by means of a keypad of the portable terminal. Because of the inconvenience of key manipulation described above, the user may have many difficulties using the electronic dictionary.

In order to address these inconveniences, a new function has been proposed that photographs desired words using a camera of the portable terminal. The words of the photographed image are recognized, and the recognized words are looked up in the electronic dictionary. However, because a camera of the portable terminal typically has poor close-shot efficiency, the photographing is carried out at a greater distance than is necessary to capture the word. As a result, many words may be photographed at a time, and the user must then select the desired word from the photographed image.

SUMMARY OF THE INVENTION

The present invention has been made to address at least the above problems and/or disadvantages and to provide at least the advantages described below. Accordingly, an aspect of the present invention provides a character recognition method and apparatus for reducing user inconvenience.

Another aspect of the present invention provides a character recognition method and apparatus that is easy to manipulate.

Another aspect of the present invention provides a character recognition method and apparatus having a high character recognition rate and a high processing speed.

According to one aspect of the present invention, a method is provided for recognizing characters in a portable terminal with a scan module. Scanned image data is generated by the scan module by scanning a scan target through a scanning-light input/output panel provided on an external surface of the portable terminal as the portable terminal moves across the scan target. Part of the scanned image data is deleted if a current moving speed of the portable terminal is less than a lower limit of an optimal scan speed range, and character recognition is performed on remaining scanned image data. Image data most similar to the scanned image data is detected from a previously stored correction image database if the current moving speed is greater than an upper limit of the optimal scan speed range, and characters corresponding to the detected image data are output as character recognition results.

According to another aspect of the present invention, an apparatus is provided for recognizing characters in a portable terminal. The apparatus includes an acceleration sensor for measuring a current moving speed of the portable terminal. The apparatus also includes a scan module having a scanning-light input/output panel installed on an external surface of the portable terminal, for generating scanned image data by scanning a scan target as the portable terminal moves across the scan target. The apparatus further includes a controller for deleting part of the scanned image data when the current moving speed of the portable terminal is less than a lower limit of an optimal scan speed range, and performing character recognition on remaining scanned image data. The controller also detects image data most similar to the scanned image data from a previously stored correction image database when the current moving speed is greater than an upper limit of the optimal scan speed range, and outputs characters corresponding to the detected image data as character recognition results.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
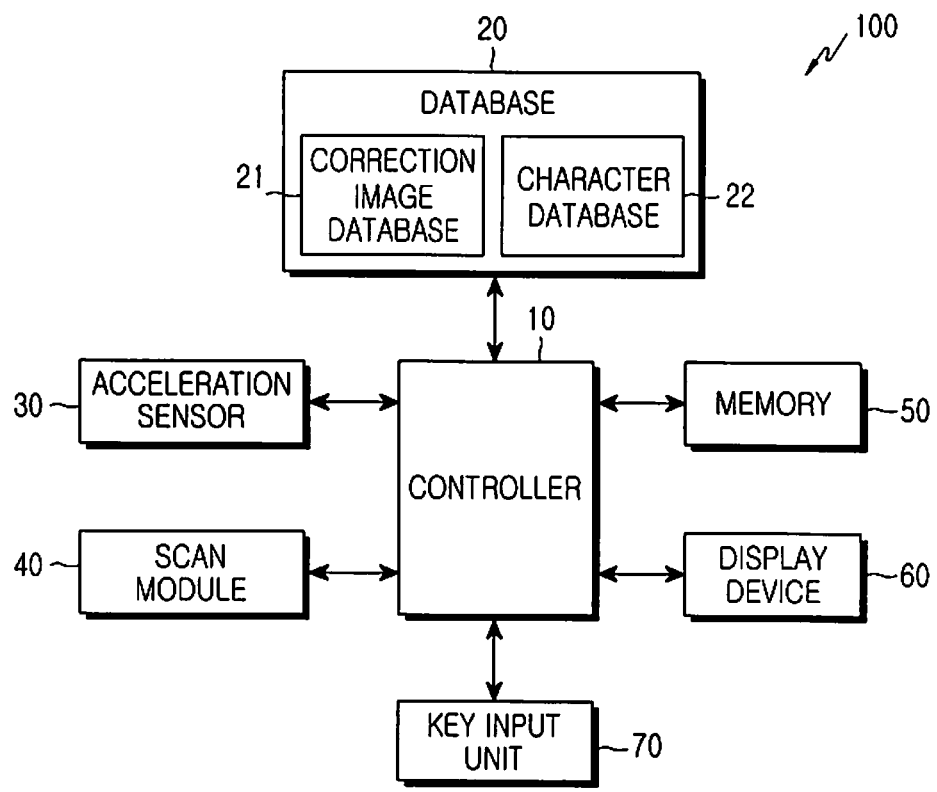
FIG. 1 is a diagram illustrating a structure of a portable terminal, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

According to an embodiment of the present invention, a scan module and an acceleration sensor are provided in a portable terminal. As the portable terminal performs scanning by moving over a scan target after the scan module is activated, image data for the scan target is generated. The generated image data is corrected according to a moving speed of the portable terminal, and character recognition is performed on the corrected image data.

Referring initially to FIG. 1, a diagram illustrates a structure of a portable terminal, according to an embodiment of the present invention. A portable terminal 100 includes a controller 10, a database 20, an acceleration sensor 30, a scan module 40, a memory 50, a display device 60, and a key input unit 70.

The controller 10, which controls the overall operation of the portable terminal 100, controls each function unit utilized in a character recognition process of an embodiment of the present invention.

The display device 60 displays data information stored in the memory 50 and various images on a screen under the control of the controller 10. According to an embodiment of the present invention, the display device 60, under the control of the controller 10, displays recognized characters or images generated by scanning on the screen. The display device 60 also displays search results obtained using recognition results or the recognized characters.

The key input unit 70 has a plurality of alphanumeric keys, direction keys, and function keys for activating functions of the portable terminal 100. The key input unit 70 provides key input data, which corresponds to keys pressed by a user, to the controller 10.

The memory 50 stores processing and control programs for the controller 10, reference data, and a variety of updatable storage data. The memory 50 is provided as a working memory of the controller 10. Further, the memory 50 stores scanned image data generated by the scan module 40 and character-recognized data. According to an embodiment of the present invention, the memory 50 stores an optimal scan speed, which is a moving speed of the portable terminal 100 at which scanned characters are most easily recognized as the characters written or printed on the scan target.

The acceleration sensor 30 measures a moving speed based on movement of the portable terminal 100 and outputs the moving speed to the controller 100, when a character scan mode is set.

The scan module 40 operates under the control of the controller 10, and is activated when the character scan mode is set. A scanning-light input/output panel 44 in the scan module 40 may be installed on a proper external surface of the portable terminal 100. Therefore, the user may scan a document by moving the scanning-light input/output panel 44 over a scan target or a document in a manner similar to that of a pen scanner.

Figure 2:
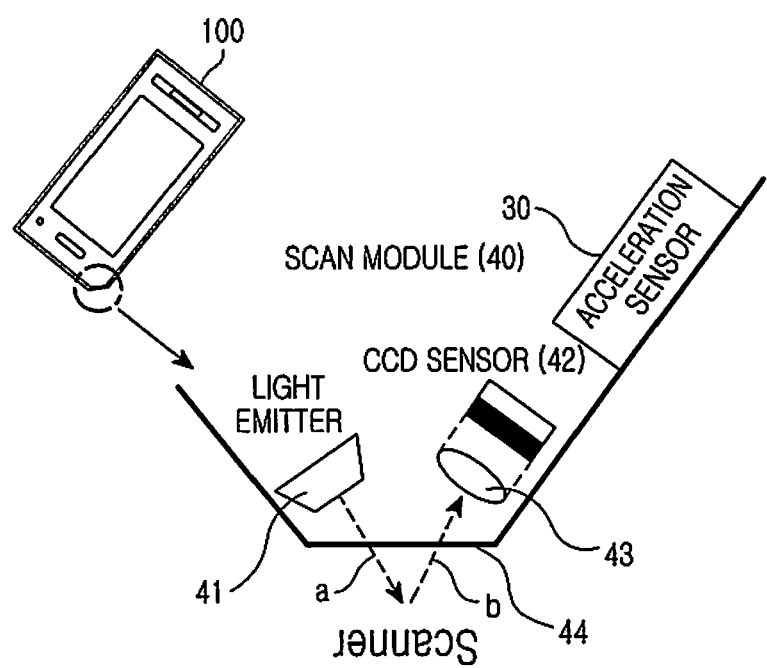
FIG. 2 is a diagram illustrating a structure of a scan module, according to an embodiment of the present invention.

FIG. 2 is a diagram illustrating a structure of the scanning-light input/output panel 44 mounted on a corner of the portable terminal 100, according to an embodiment of the present invention.

The scan module 40 includes a light emitter 41 for projecting a light 'a' onto a recognition target, the scanning-light input/output panel 44, a lens 43 for passing a reflected light 'b' reflected from the target, and a Charge-Coupled Device (CCD) sensor 42 for converting the reflected light 'b' into analog image data.

The light emitter 41 projects the light 'a' under the control of the controller 10 upon receiving a scan start request while the scan module 40 is activated. The scan start request may be generated receiving input of a particular key. In an alternative embodiment of the present invention, a pressure sensor may be provided near the scanning-light input/output panel 44 so that a scan start request is generated if the scanning-light input/output panel 44 contacts a scan target with at least a predetermined pressure.

The projected light 'a' reaches a recognition target by passing through the scanning-light input/output panel 44, and causing generation of the reflected light 'b'. The reflected light 'b' is concentrated on the lens 43 passing by through the scanning-light input/output panel 44, and then input to the CCD sensor 42. The CCD sensor 42 generates an analog image signal, and the generated analog image signal is converted into 1-bit digital image data by an analog-to-digital converter and then stored in the memory 50. For example, with respect to values of the 1-bit digital image data, '0' may indicate white, or a blank, and '1' may indicate black, or a character part. In this embodiment of the present invention, digital image data generated through this process is referred to as 'scanned image data.'

Upon generation of a scan start request, the acceleration sensor 30 also measures a moving speed of the portable terminal 100 and outputs the moving speed to the controller 10 in real time, according to an embodiment of the present invention. Prior to performing character recognition on the scanned image data, the controller 10 corrects the scanned image data based on the current moving speed measured by the acceleration sensor 30, if necessary. This correction may be necessary because the scanned target may be distorted according to the moving speed of the portable terminal 100. If the moving speed is too high, not all characters may be scanned or serious distortion may occur, increasing error probability of character recognition. On the contrary, if the moving speed is too low, analog image data generated for the same characters will increase in amount of data, and the increase in data amount may cause an increase in time required for performing character recognition. Therefore, accurate and fast character recognition results may be obtained by performing character recognition after correcting scanned image data according to the moving speed of the portable terminal 100 during scanning.

Using the scanned image data or the corrected scanned image data, the controller 10 performs character recognition by searching the database 20. The database 20 is a database consisting of data needed for character scanning and character recognition, and includes a correction image database 21 and a character database 22. The character database 22, which consists of data needed for character recognition, includes a variety of character data. The correction image database 21 is a database that is referred to when correction is required for the scanned image data. The correction image database 21 consists of a variety of image data generated by scanning each image at a variety of scan speeds that are higher than or equal to an optimal scan speed. The variety of image data is classified as image data associated with an arbitrary character. The database 20 may include a dictionary database consisting of many different languages.

A process of performing character recognition in the portable terminal 100 is described below with reference to FIGS. 3 and 4.

Figure 3:
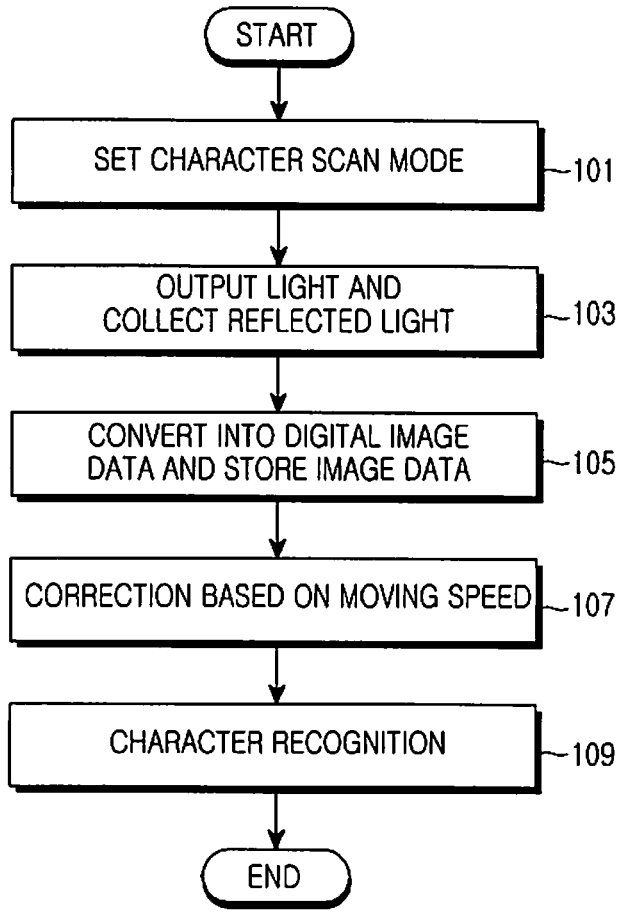
FIG. 3 is a diagram illustrating an operation of a portable terminal, according to an embodiment of the present invention.
Figure 4:
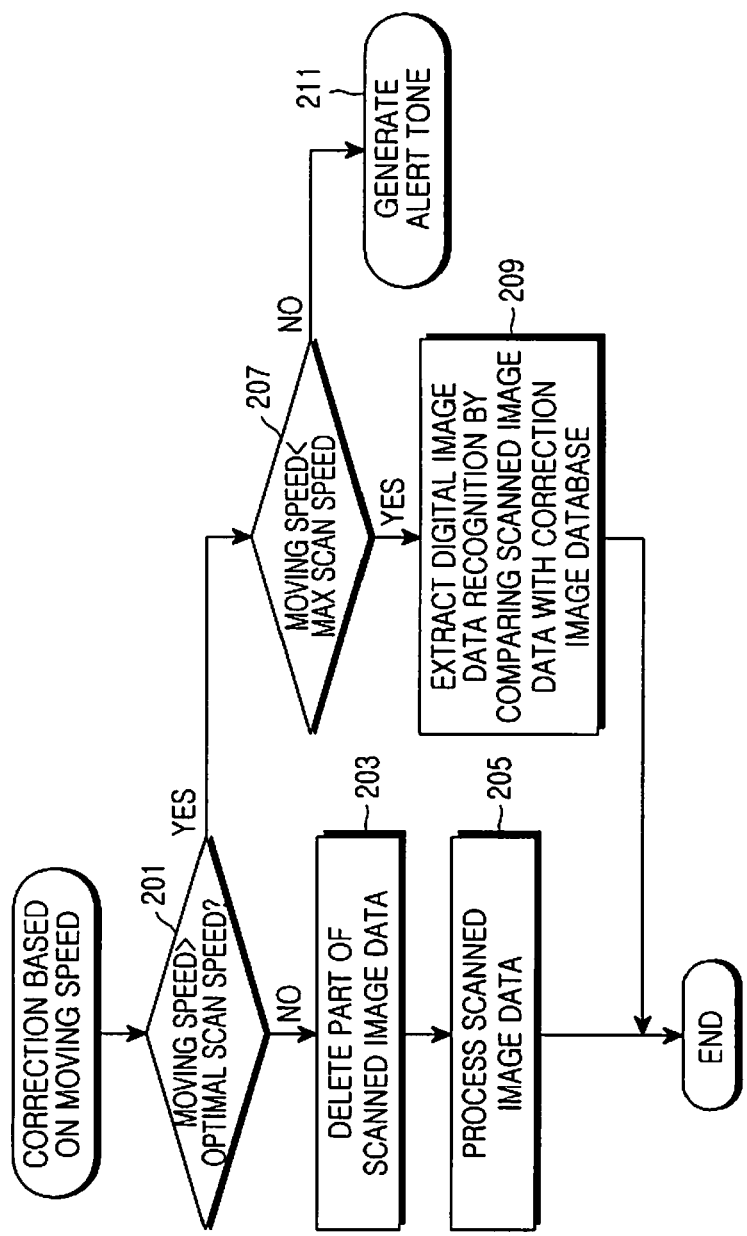
FIG. 4 is a diagram illustrating a process of correcting scanned image data, according to an embodiment of the present invention.

Referring to FIG. 3, if a character scan mode is set in step 101, the controller 10 of the portable terminal 100 controls the scan module 40 in step 103 so that light is emitted from the light emitter 41 and a reflected light is collected at the lens 43 and the CCD sensor 42. In step 105, the controller 10 generates analog image data from the reflected light, converts the analog image data into digital image data, and stores the digital image data in the memory 50 as scanned image data. In step 107, the controller 10 corrects the scanned image data according to a moving speed of the portable terminal 100, which is measured by the acceleration sensor 30. In step 109, the controller 10 performs character recognition on the scanned image data.

The process of correcting the scanned image data is described in greater detail below with reference to FIG. 4.

In step 201, the controller 10 determines whether the current moving speed of the portable terminal 100, which is measured by the acceleration sensor 30, is greater than an optimal scan speed. If the current moving speed is not greater than the optimal moving speed, the controller 10 deletes part of the scanned image data in step 203. The controller then processes the partially-deleted scanned image data, converts it into character data, and performs character recognition thereon in step 205. The character database 22 may be referred to in performing character recognition.

When a scan speed is lower than that which is needed during scanning, the stored digital image data may include duplicated data. An amount of the stored digital image data increases due to the duplicate data, and the increase in the amount of the stored digital image data causes an increase in time required for character recognition. Thus, in order to delete the duplicate data and prevent the increase in time required for character recognition, the controller 10 deletes part of the stored digital image data and performs character recognition thereon, when the current moving speed of the portable terminal 100 is less than the optimal scan speed.

For example, in deleting partial image data from the scanned image data, it may be assumed that the number of scanned images generated in the CCD sensor 42 is 6 when scanning is performed at the optimal scan speed. However, 11 scanned images may have been generated by performing scanning slower than the optimal scan speed. It is possible to extract characters more exactly by processing all of the 11 scanned images and using them for character recognition, but the time required for recognition processing, battery consumption, occupation of the controller 10, and use of the memory 50 may increase accordingly. Therefore, it is possible to use only 50% of the scanned images for character recognition by deleting even- or odd-numbered scanned images among the 11 scanned images. In another example, it may be possible to perform optimized character recognition by selecting one scanned image as an image for character recognition, deleting the next two consecutive scanned images, selecting the next one scanned image as an image for character recognition, and so forth. Because sequentially neighboring scanned images include duplicate data, even though an arbitrary scanned image is used as an image for character recognition and the next one or more scanned images are deleted, normal character recognition may still be possible.

If the current moving speed is greater than the optimal scan speed in step 201, the controller 10 compares the current moving speed with a maximum scan speed in step 207. If the current moving speed is not less than the maximum scan speed, the controller generates an alert tone in step 211. The maximum scan speed represents a maximum moving speed of the portable terminal 100, at which the scan results may fall within a normal range. Therefore, if the current moving speed is at or above the maximum scan speed, the controller 10 generates an alert tone to make the user re-perform the scanning, and then deletes the scanned image data.

However, if the current moving speed is less than the maximum scan speed and greater than the optimal scan speed, the controller 10 extracts digital image data for recognition by comparing the scanned image data with the correction image database 21, and performs character recognition on the extracted image data in step 209. The controller 10 detects image data most similar to the scanned image data from the correction image database 21, and characters corresponding to the detected image data become character recognition results.

Through this process, embodiments of the present invention may correct scanned image data based on the moving speed of the portable terminal 100 during scanning, and perform accurate and fast character recognition using the corrected scanned image data.

The resulting characters derived after the character recognition process may be stored in the memory 50 or displayed on the display device 60. The resulting characters may also be used for additional services such as, for example, a dictionary or directory search.

As is apparent from the foregoing description, embodiments of the present invention can reduce user inconvenience and simplify user manipulation during character recognition. In addition, embodiments of the present invention can perform character recognition at a high recognition rate and speed.

Although the optimal scan speed is limited to a particular speed in the foregoing embodiments, the optimal scan speed may be a particular speed range in alternative embodiments of the present invention. If the current moving speed falls within an optimal scan speed range, character recognition can be performed using the scanned image data without a separate correction process. Additionally, if the current moving speed is less than a lower limit of the optimal scan speed range, part of the scanned image data may be deleted before character recognition. If the current moving speed is greater than an upper limit of the optimal scan speed range, the correction image database may be used.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for recognizing characters in a portable terminal with a scan module, comprising the steps of:
   generating scanned image data corresponding to a scan target using the scan module;
   measuring a current moving speed of the portable terminal while the portable terminal moves across the scan target;
   deleting part of the scanned image data when the current moving speed is less than a lower limit of an optimal scan speed range, and performing character recognition on remaining scanned image data; and
   detecting image data most similar to the scanned image data from a correction image database when the current moving speed is greater than an upper limit of the optimal scan speed range, and outputting characters corresponding to the detected image data as character recognition results,
   wherein the correction image database is an aggregate of image data generated by scanning that is performed when the portable terminal moves at a moving speed greater than or equal to the upper limit of the optimal scan speed range.

2. The method of claim 1, further comprising:
   performing character recognition on the scanned image data, when the current moving speed falls within the optimal scan speed range.

3. The method of claim 1, further comprising:
generating an alert tone and deleting the scanned image data, when the current moving speed is greater than a maximum scan speed.

4. The method of claim 1, wherein deleting the part of the scanned image data and performing the character recognition comprises:
deleting even- or odd-numbered scanned image data from the scanned image data, when the current moving speed is less than the lower limit of the optimal scan speed range; and
performing the character recognition on the remaining scanned image data.

5. The method of claim 1, further comprising:
performing a dictionary search using the character recognition results.

6. An apparatus for recognizing characters in a portable terminal, comprising:
an acceleration sensor for measuring a current moving speed of the portable terminal;
a scan module for generating scanned image data by scanning a scan target as the portable terminal moves across the scan target; and
a controller for deleting part of the scanned image data when the current moving speed is less than a lower limit of an optimal scan speed range, and performing character recognition on remaining scanned image data; and for detecting image data most similar to the scanned image data from a correction image database when the current moving speed is greater than an upper limit of the optimal scan speed range, and outputting characters corresponding to the detected image data as character recognition results,
wherein the correction image database is an aggregate of image data generated by scanning that is performed when the portable terminal moves at a moving speed greater than or equal to the upper limit of the optimal scan speed range.

7. The apparatus of claim 6, wherein the controller performs the character recognition on the scanned image data, when the current moving speed falls within the optimal scan speed range.

8. The apparatus of claim 6, wherein the controller generates an alert tone and deletes the scanned image data, when the current moving speed is greater than a maximum scan speed.

9. The apparatus of claim 6, wherein the controller deletes even- or odd-numbered scanned image data from the scanned image data when the current moving speed is less than the lower limit of the optimal scan speed range, and performs the character recognition on the remaining scanned image data.

10. The apparatus of claim 6, wherein the controller performs a dictionary search using the character recognition results.

11. The apparatus of claim 6, wherein the scan module comprises:
a light emitter for projecting a light;
a lens for passing a reflected light from the scan target;
a Charge-Coupled Device (CCD) sensor for converting the reflected light into analog image data; and
an analog-to-digital converter for generating the scanned image data by converting the analog image data into digital image data.

* * * * *